(12) United States Patent
Au et al.

(10) Patent No.: US 7,868,788 B2
(45) Date of Patent: Jan. 11, 2011

(54) SYSTEM AND METHOD FOR ENCODING DATA BASED ON A COMPRESSION TECHNIQUE WITH SECURITY FEATURES

(75) Inventors: Oscar Chi Lim Au, Hong Kong (CN); Jiantao Zhou, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 50 days.

(21) Appl. No.: 12/486,537

(22) Filed: Jun. 17, 2009

(65) Prior Publication Data

US 2009/0309769 A1 Dec. 17, 2009

Related U.S. Application Data

(60) Provisional application No. 61/129,298, filed on Jun. 17, 2008.

(51) Int. Cl.
H03M 7/30 (2006.01)
(52) U.S. Cl. .............. 341/51; 341/87; 380/43; 380/269
(58) Field of Classification Search ............. 341/51, 341/87; 380/42, 43, 269
See application file for complete search history.

(56) References Cited

U.S. PATENT DOCUMENTS 5,903,230 A * 5/1999 Masenas ............... 341/51
6,121,901 A * 9/2000 Welch et al. ........... 341/51
2007/0028088 A1 * 2/2007 Bayrak et al. .......... 713/150
2007/0096953 A1 * 5/2007 Odagiri ................ 341/50
2010/0119070 A1 * 5/2010 Peterson ............... 380/259

OTHER PUBLICATIONS

Nelson, "Data Compression," (1989). Retrieved from http://marknelson.us/1989/10/01/1zw-data-compression on Jun. 17, 2009.
Welch, "A technique for high-performance data compression," *Computer*, 17: 6, 8-19 (Jun. 1984).
Ziv et al., "A universal algorithm for sequential data compression," *IEEE Transactions on Information Theory*, IT-23: 3, 337-343 (May 1977).
Ziv et al., "Compression of individual sequences via variable-rate coding," *IEEE Transactions on Information Theory*, IT-34: 5, 530-536 (Sep. 1978).

* cited by examiner

*Primary Examiner*—Howard Williams
(74) *Attorney, Agent, or Firm*—Leydig, Voit & Mayer, Ltd.

(57) ABSTRACT

Described herein is an efficient encryption method and system having improved security features based on randomness. The method and system utilize a random dictionary insertion and a random dictionary permutation, and a key stream generated by a stream cipher. Security analysis results show that the method and system provides a higher level of security without incurring any coding efficiency loss, compared with a existing encoding methods.

25 Claims, 6 Drawing Sheets

Figure 2

Any programmer working on mini or microcomputers in this day and age should have at least some exposure to the concept of data compression. In MS-DOS world, programs like ARC, by System Enhancement Associates, and PKZIP, by PKware are ubiquitous. ARC has also been ported to quite a few other machines, running UNIX, CP/M, and so on. CP/M users have long had SQ and USQ to squeeze and expand programs. Unix users have the COMPRESS and COMPACT utilities. Yet the data compression techniques used in these programs typically only show up in two places: file transfers over phone lines, and archival storage.

(a)

```
??????????????????????????????????????????????Z
ZZZZZZZZZZZZZZZ???????????????????????????????
??????????????????????????????wwwwwwwwwwwwZZZ
?????????????????????????????QQQQQQQQQQQ????
??????????????Q???NNNNNZZZZZZZZZZZ?Q?Q?
?????????????????????????????????????????FFF
FFFFFFFFFFFF???????????????????????????????
?????????????NNNNNNNQQQ??????????????  ZZZZZZ
ZZZZZZZ????NNNNNNNN???????NNNNNNZZZZZ
ZZZZZZZZZZZZ00000???????Q?Q??????????????~~
~??????????ssssssssss????????
```

SYSTEM AND METHOD FOR ENCODING DATA BASED ON A COMPRESSION TECHNIQUE WITH SECURITY FEATURES

CROSS-REFERENCE TO RELATED APPLICATIONS

This patent application claims the benefit of U.S. Provisional Patent Application No. 61/129,298, filed Jun. 17, 2008, which is incorporated by reference in its entirety.

TECHNICAL FIELD

The present invention is related to data encoding and encryption in general, and to the Lempel-Ziv-Welch data compression in particular.

BACKGROUND OF THE INVENTION

In their landmark papers in 1977 and 1978, Ziv and Lempel proposed two universal lossless data compression algorithms, which are called LZ77 and LZ78, respectively. Since then, many variants were suggested such as the Lempel-Ziv-Welch (LZW), the Lempel-Ziv-Storer-Szymanski (LZSS), and the Lempel-Ziv-Ross (LZR). Among these variants of the original LZ78, the LZW, designed by Welch in 1984, is perhaps the most famous and popular modification. It has been adopted for use in many systems and standards including the UNIX system, the Graphics Interchange Format (GIF) standard, the V.42bis modem standard, and in the TIFF image and PDF formatted documents as an has option.

A straightforward approach to protect the bit stream generated from LZW algorithm is to encrypt it using a stream cipher, that is, applying an exclusive or (XOR) operations on the LZW bit stream and a key stream. However, this scheme is very vulnerable to the chosen-plaintext attack. Specifically, an attacker can encode a source symbol sequence S and obtain the compressed and encrypted bit stream Y. Since the LZW algorithm is publicly known, the attacker can easily determine the intermediate bit stream X produced by the LZW encoder. Therefore, the key stream can be easily recovered by taking $K=X \oplus Y$, where $\oplus$ is the XOR operator. Alternatively, one can encrypt the bit stream generated from the LZW algorithm using a block cipher such as those defined in the Advanced Encryption Standard (AES). Indeed, this encryption scheme provides very high security features. However, an important disadvantage of the block cipher is that it is complicated and computationally slow, compared with the stream cipher, as the block cipher normally involves several rounds of table lookup operations, XOR operations, and mixing operations. In addition, since in most multimedia applications, the required security level is much lower than that in the military applications, it may not be necessary to use the AES to achieve such a high security at the cost of slow computations.

There are existing systems and methods that exploit the LZW algorithm itself for achieving high security features. For example, Xie et al. "Secure Lempel Ziv Compression with Embedded Encryption," Proc. SPIE, vol. 5681, pp. 318-327, 2005 describes an encryption scheme based on the LZ78 method. The basic idea is to build multiple dictionaries with different entry orders, and then select a random dictionary in each compression step. These existing methods, however, are still vulnerable to a number of attacks such as the chosen-plaintext attack.

BRIEF SUMMARY OF THE INVENTION

Described herein is a system and method for data encryption based on a data compression technique in multimedia applications, with three requirements: (1) no coding efficiency loss; (2) high security; (3) the encryption cost should be approximately equal to that of the scheme using standard LZW, followed by a stream cipher.

According to some embodiments, the system includes a low-cost modified LZW module using a random dictionary insertion and random dictionary permutation, and a stream cipher. A very desirable property of the low-cost modified LZW is that the random dictionary insertion can be incorporated very easily with a hashing algorithm, which has been widely used in practical LZW implementations to speed up the string comparison in the dictionary. Cryptanalysis results show that this system can provides satisfactory level of security without influencing the coding efficiency.

According to some other embodiments, a method is provided for encoding data using a compression technique based on a dictionary. The method includes (1) receiving a source symbol sequence, (2) initializing the dictionary using a source alphabet in accordance with a random insertion, and (3) encoding the source symbol sequence in accordance with the compression technique based on the dictionary. The source alphabet includes a plurality of characters and the dictionary has a plurality entries. The source symbol sequence includes at least a first and a second symbols.

During the initialization of the dictionary, each of the plurality of characters is assigned to one of the plurality of entries.

During the encoding, the dictionary is further updated in accordance with the random insertion and a random permutation.

The step of encoding the source symbol sequence further includes adding the first symbol to a string and searching the string having the first symbol in the dictionary. In addition, the encoding step also includes determining that the dictionary has a match for the string having the first symbol, and adding the second symbol to the string having the first symbol.

Alternatively, if the dictionary does not have a match for the string having the first symbol, the method further includes determining a dictionary index for the string without the first symbol, randomly selecting an empty entry in the dictionary for storing the string having the first symbol, and initializing the string to the first symbol. The empty entry is selected based on a keyed hashing function having a private key.

In a further embodiment, the encoding step includes arranging the dictionary into a two-dimensional array having a plurality of columns and a plurality of rows, performing a column permutation on the plurality of columns, and performing a row permutation on the plurality of rows. The row permutation includes cyclically shifting each of the plurality of columns and each of the plurality of rows. Specifically, each even column is cyclically shifted by a first random offset, each odd column is cyclically shifted by a second random offset, each even row is cyclically shifted by a third random offset, each odd row is cyclically shifted by a fourth random offset.

In still a further embodiment, the method includes generating an encoded data stream by combining the encoded symbol sequence with a key stream generated by a stream cipher.

In some further embodiments, the compression technique is one of a Lempel-Ziv-Welch compression, a Lempel-Ziv-Storer-Szymanski compression, and a Lempel-Ziv-Ross compression.

According to still some other embodiments, a computer readable medium is provided, having computer codes stored thereon. The computer codes includes computer executable instructions when executed by one or more digital processors providing data encoding using a compression technique based on a dictionary. The computer codes include instructions for receiving a source symbol sequence, instructions for initializing the dictionary using a source alphabet in accordance with a random insertion, instructions for encoding the source symbol sequence in accordance with the compression technique, and instructions for updating the dictionary in accordance with the random insertion and a random dictionary permutation during the encoding.

In a further embodiment, the source symbol sequence includes a plurality of symbols. And the computer codes further include instructions for adding a first symbol to a string, instructions for determining that the dictionary does not have an entry that matches the string having the first symbol, instructions for determining a dictionary index for the string without the first symbol, instructions for randomly selecting an empty entry in the dictionary for storing the string having the first symbol, and instructions for initializing the string to the first symbol.

According to still some other embodiments, a method is provided for encoding a source symbol sequence using a dictionary having a plurality of entries. The source symbol sequence includes a plurality of symbols. The method includes performing the following steps until the source symbol sequence is exhausted (1) initializing a string to a symbol of the source symbol sequence, (2) searching in the dictionary for a longest entry matching the string, (3) performing (a)-(b) until no match for the string can be found in the dictionary: (a) determining that the dictionary has the longest entry matching the string and the dictionary index of the longest entry matching the string and (b) inserting another symbol from the source symbol sequence to the string. The method further includes storing the dictionary index, randomly selecting an entry in the dictionary for storing the string without the another symbol, and performing a random dictionary permutation.

In one embodiment, the step of performing the random dictionary permutation further includes arranging the dictionary into a two-dimensional array having a plurality of columns and a plurality of rows, and performing the random dictionary permutation on the plurality of columns and the plurality of rows. Specifically, the method includes cyclically shifting at least one odd column of the plurality of columns by a first random offset, cyclically shifting at least one even column of the plurality of columns by a second random offset, cyclically shifting at least one odd row of the plurality of rows by a third random offset, and cyclically shifting at least one even row of the plurality of rows by a fourth random offset.

In another embodiment, the method further includes generating a key stream for use in the random insertion and the random dictionary permutation. The entry for storing the string without the another symbol is selected based on a hashing function having secret keys associated with a portion of the key stream.

In still another embodiment, the method further includes generating a stream of dictionary indices representing the source symbol sequence, generating an encoded data stream by combining the stream of dictionary indices with a key stream in accordance with an exclusive-or operation, and outputting the encoded data stream.

BRIEF DESCRIPTION OF THE SEVERAL VIEWS OF THE DRAWING(S)

FIG. 2 is an example of dictionary permutation (a) before permutation; (b) after column permutation; and (c) after column and row permutation;

FIG. 6(a) shows one example of a source symbol sequence in the form of plaintext and FIG. 6(b) shows the results of using a standard LZW technique to decode the source symbol sequence encoded based on the method described herein.

DETAILED DESCRIPTION OF THE INVENTION

Figure 1:
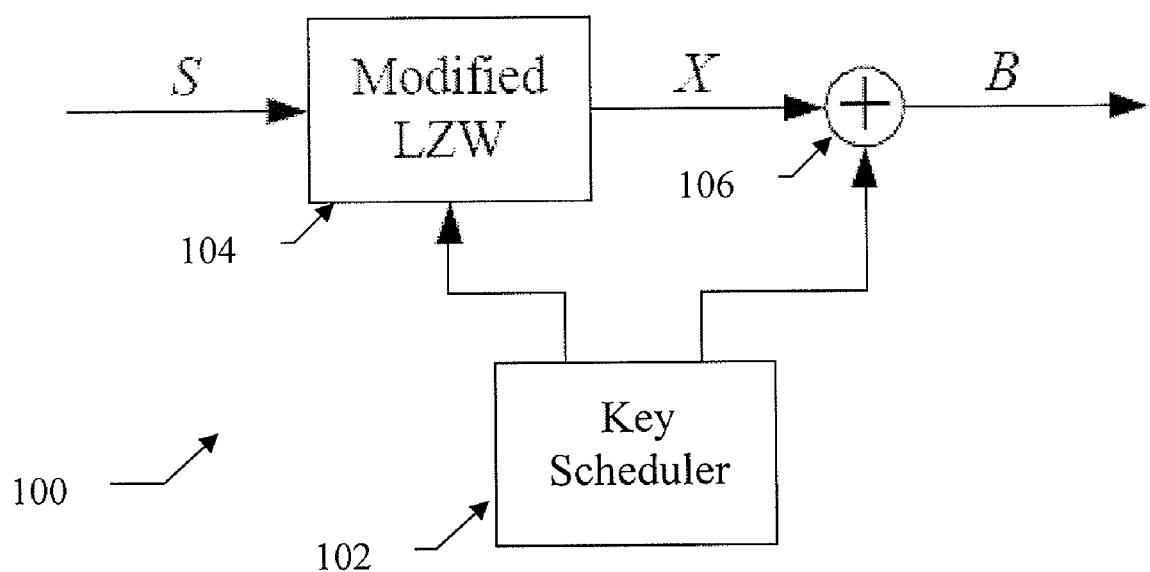
FIG. 1 is the schematic diagram of our proposed scheme.

According to some embodiments, a schematic diagram of a system 100 is shown in FIG. 1 for performing data encryption using a compression technique. The compression technique can be any technique using a dictionary such as the Lempel-Ziv-Welch (LZW) compression, the Lempel-Ziv-Storer-Szymanski (LZSS) compression, and the Lempel-Ziv-Ross (LZR) compression. For ease of discussion, a modified LZW compression is shown in Figure. The invention described herein, however, is not limited to the LZW compression and can be adapted to other compression methods using a dictionary by one skilled in the art after reading the description.

According to the embodiment shown in FIG. 1, the modified LZW compression has security features that are further described below. Specifically, system 100 includes two fundamental components: a key scheduler 102 for generating a key stream and a modified LZW module 104 for carrying out the LZW encoding. In some further embodiments, the system may further include an XOR operator 106 as shown in FIG. 1 for further encrypting the LZW data stream using a stream cipher based on the key stream generated by key scheduler 102.

Unlike existing encoding techniques based on LZW, the LZW compression described herein utilizes random dictionary insertions and random dictionary permutations for improved security against various types of attacks such as the cipher-only attack, the known-plaintext attack, the chosen-plaintext attack, and the chosen-ciphertext attack. As shown in FIG. 1, modified LZW module 104 uses part of the key stream generated by key scheduler 102 to perform the secure compression on the source symbol sequence S. An XOR operation is then performed by XOR operator 106 on the bit stream X produced by the modified and the remaining key stream generated by key scheduler 102 to form the final encrypted output B. Details of the system and method for providing data encryption based on a modified LZQ compression is described below. In the following description, it is assumed that i denotes positive integer and $(i)_2^b$ denotes a binary representation of i having a length b.

The Modified LZW with Random Insertion and Random Dictionary Permutation

Let the source alphabet be $A=\{a_1, a_2, \ldots, a_N\}$, where N is the number of characters of the source alphabet A. Let the input source symbol sequence be $S=\{s_1, s_2, \ldots, s_M\}$, which is to be encoded, where M is the number of symbols in the source symbol sequence S. For ease of description, a number of b=12 bits are used to represent each dictionary index, that is, the size of the dictionary is $2^b=4096$. Other choices of b are, of course, possible and obvious to one of skilled in the art after reading this description. The encoding procedure is described below.

Figure 4:
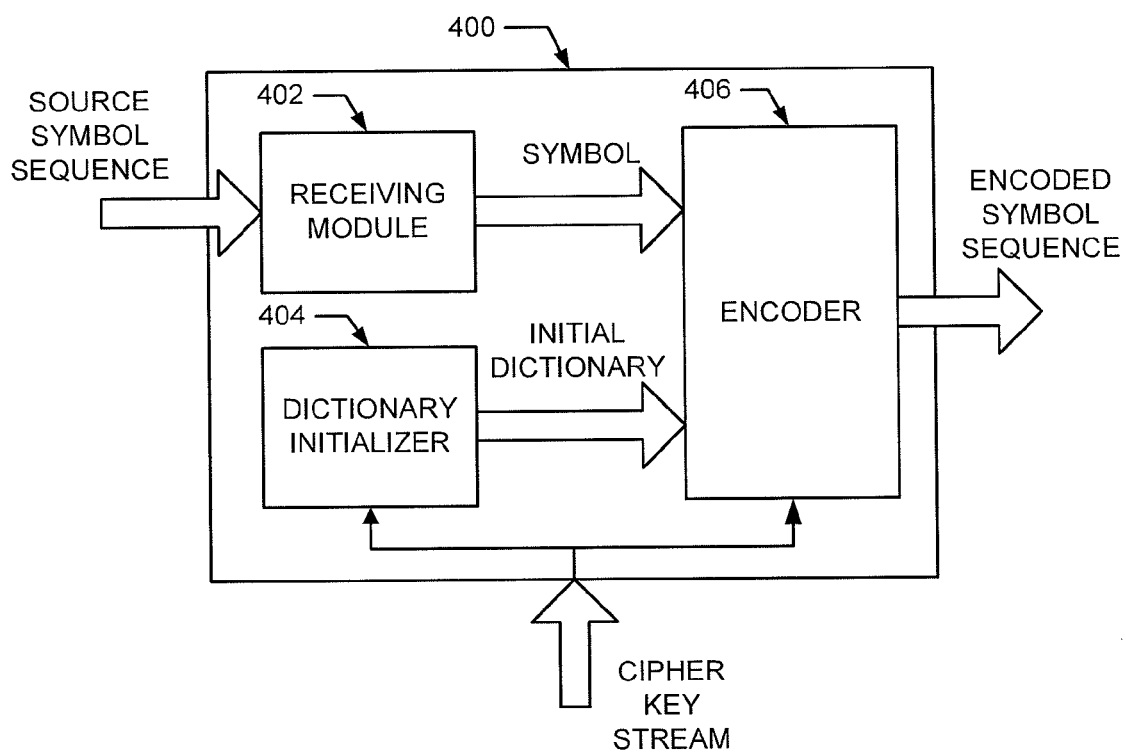
FIG. 4 depicts a schematic diagram of a computing device having a number of components for implementing the encoding method.

According to the embodiment depicted in FIG. 4, after the input symbol sequence S to be encoded is received (step 402), a dictionary is initialized using the source alphabet (step 404). Specifically, a dictionary having $2^b$ empty entries is constructed, of which N entries are randomly selected for storing the characters $a_i$, $1 \leq i \leq N$, of the source alphabet A. In other words, each characters $a_i$ of the source alphabet A is randomly inserted or filled in the dictionary.

This process is different from the traditional LZW compression where the characters $a_i$, $1 \leq i \leq N$, of the source alphabet A are assigned to the first N entries of the dictionary. One disadvantage of the traditional LZW method is that the first $b-[\log_2 N]$ bits are fixed to be zero. This information may be used by an attacker to recover part of the key stream, thereby making the encoded data particularly vulnerable. In contrast, according to the embodiment described herein, since the dictionary is initialized based on the random insertion, it is very difficult for the attacker to recover the key stream.

After the dictionary is initialized, a modified LZW method is used to encoded the source symbol sequence S (step 406), where the dictionary of the LZW scheme is updated in accordance with the random insertion in every iteration. Specifically, the source symbols $s_j$, $1 \leq j \leq M$, from the symbol sequence S are input and accumulated one by one in a string I. After each symbol is input and concatenated to the string I, the dictionary is searched for a match for the string I. As long as a match for the string I is found in the dictionary, the concatenation and search process is continued.

At certain point, adding the next symbol x from the symbol sequence S to the string I causes the search to fail for the first time, that is, a match is found for the string I before adding the symbol x but no match is found for the string Ix after adding the symbol x. Then the following steps are carried out. Specifically, a dictionary index is determined, pointing to the match for the string I before adding x. As described earlier, this dictionary index is represented by b binary bits. Subsequently, an empty entry is randomly selected from the dictionary for storing a copy of the string Ix after adding x. The random selection of the empty entry is based on a keyed hashing function with the string Ix as input. After the copy of the string Ix is stored in the dictionary, the string I is initialized to the symbol x.

Accordingly to one embodiment, the new string Ix is stored in a location in the dictionary based on an address formed by the string itself using a public hashing function. This strategy greatly speeds up the dictionary search. Alternatively, a private hashing function with a secret key is used to determine the address for storing the string Ix. In other words, some parameters of the hashing function are replaced with secret keys, such that the output of the hashing function is unpredictable without these secret keys.

According to a further embodiment, after the string Ix is stored in the dictionary, a random permutation is performed on the updated dictionary as follows.

Figure 2:
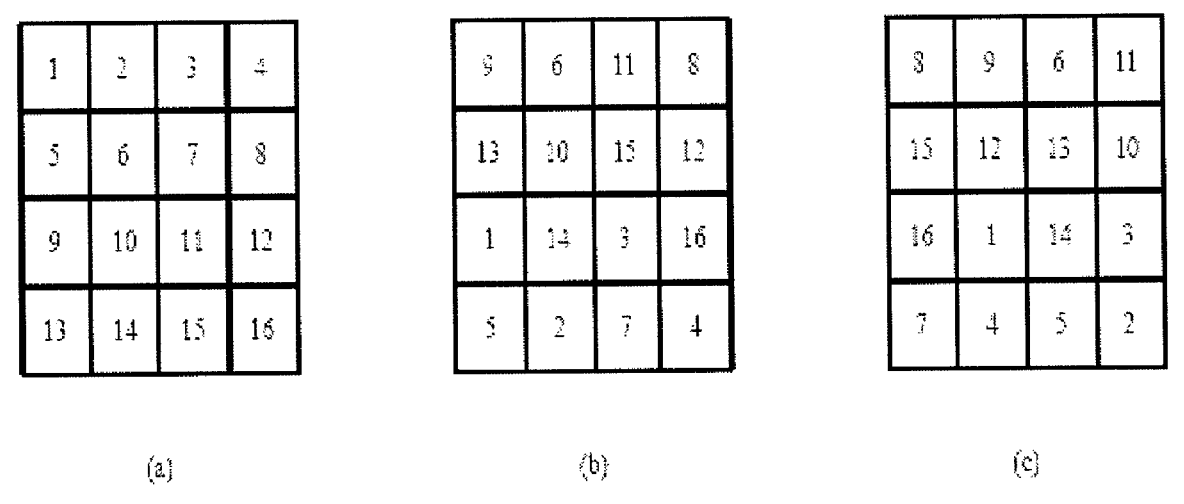

The dictionary is first arranged into a two-dimensional array having $2^{b/2}$ columns and $2^{b/2}$ rows. Two index sets are defined as $G_1=\{1, 3, \ldots, 2^{b/2}-1\}$ and $G_2=\{2, 4, \ldots, 2^{b/2}\}$. Accordingly, a round of column permutation is first performed on the two-dimensional array. Those columns having indices $m \in G_1$ are subject to cyclic shifts with a offset $c_1$, where $c_1$ is a random number and $0 \leq c_1 \leq 2^{b/2}-1$. Those columns having indices $m \in G_2$ are subject to cyclic shifts with a offset $c_2$, where $c_2$ is another random number and $0 \leq c_2 \leq 2^{b/2}-1$. Similarly, a round of row permutation is applied to the two-dimensional array, with offsets $r_1$ and $r_2$ for odd rows and even row, respectively. FIG. 2 depicts an example illustrating the random dictionary permutation with parameters b=4, $c_1=2$, $c_2=3$, $r_1=1$, and $r_2=2$. FIG. 2(a) shows a two-dimensional dictionary before the permutation, FIG. 2(b) shows the two-dimensional dictionary after the column permutation, and FIG. 2(c) shows the two-dimension dictionary after the column and row permutations.

The above steps of searching, storing, initialization, and permutation are repeated until all of the symbols in the source symbol sequence S are encoded.

According to some embodiments, the above data encoding and encryption method based on the modified LZW compression may be carried out without using the random dictionary permutation.

Figure 5:
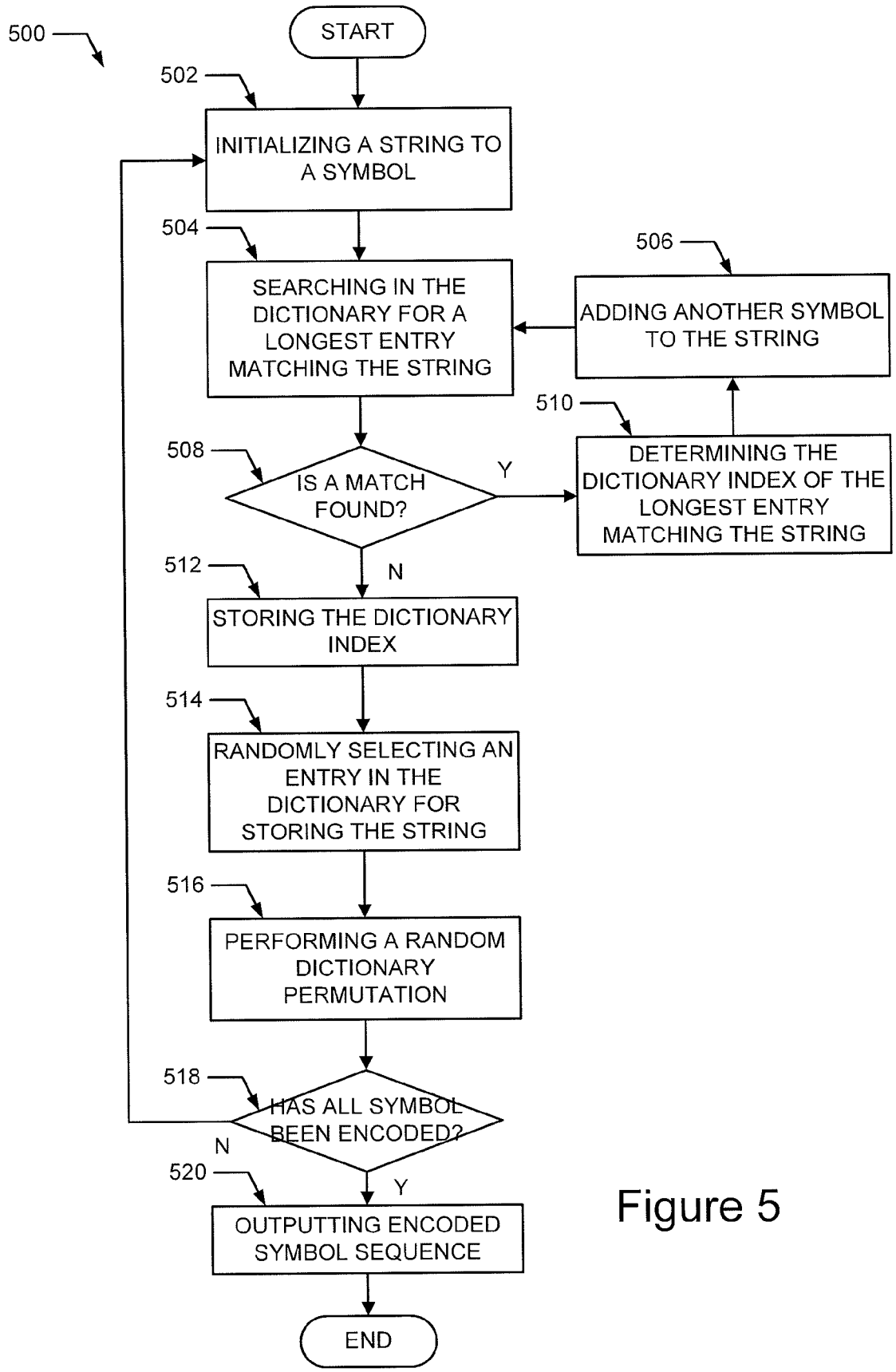
FIG. 5 depicts a schematic diagram for one embodiment of the method for encoding a symbol sequence using a compression technique based on a dictionary.

According to another embodiment as depicted in FIG. 5, a method 500 is provided for encoding a source symbol sequence using a dictionary having a plurality of entries similar to that described above, where the source symbol sequence including a plurality of symbols. As depicted in FIG. 5, method 500 include following steps. In step 502, it initializes a string to one of the plurality of symbols from the symbol sequence. In steps 504 and 508, method 500 performs a dictionary search to determine if there is an entry with the longest length that matches the string. If such match is found, method 500 then proceeds to determining the dictionary index of the longest entry matching the string (step 510) and adding another symbol from the source symbol sequence to the string (step 506). Steps 504-510 are performed until no match for the string is found. Method 500 then proceeds to storing the most recent dictionary index determined in step 510 (step 512), randomly selecting an entry in the dictionary for storing the most recent string (step 514), and performing a random dictionary permutation on the updated dictionary (step 516). If method 500 determines that all of the symbols in the source symbol sequence have been encoded (step 518), it then proceeds to outputting the encoded symbol sequence. According to the various embodiments described above, the encoded symbol sequence includes a series of dictionary indices

Key Scheduler

The role of key scheduler 102 is to generate the necessary key stream used in the modified LZW and the XOR operation. According to one embodiment, a stream cipher such as the RC4 cipher as well known in the art is used for this purpose. One advantage of the RC4 cipher is that the software and hardware complexity involved in the key stream generation in very low. Alternatively, it will be readily understand by one skilled in the art after reading this description that other stream ciphers, such as the Data Encryption Standard ciphers in the Cipher Block Chaining mode and the Very Efficient Substitution Transposition ciphers can also be used.

Computer System for Implementing the Data Encryption Method

Figure 3:
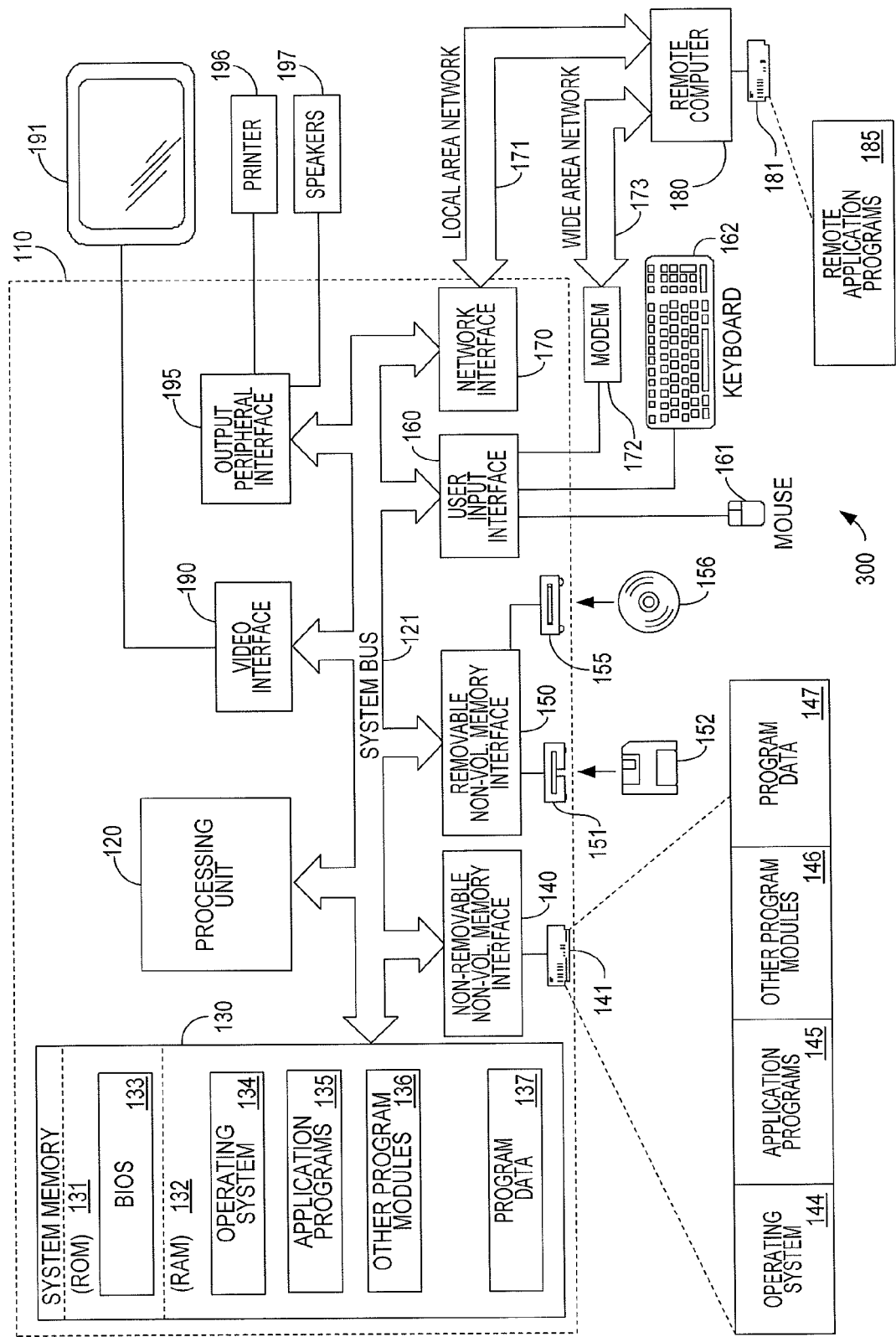
FIG. 3 is a view of a computing system for implementing the encoding method and system shown in FIG. 1.

FIG. 3 illustrates an example of a suitable hardware system 300 in which the invention may be implemented. The hardware system 300 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable electronics, network PCs, minicomputers, mainframe computers, distributed computing environments that include any of the above systems or devices, and the like.

With reference to FIG. 3, an exemplary system 300 for implementing the invention includes a computing device, such as device 110. In its most basic configuration, device 110 typically includes a processing unit 120 and a system memory 130. Depending on the exact configuration and type of computing device, system memory 130 may include volatile memory (such as RAM 132), non-volatile memory (such as ROM 131) or some combination of the two. Additionally, system 300 may also have mass storage units including non-removable memory 141 such as hard disks and/or removable memory such as conventional floppy disk 152, or optical disks (CD/DVD) 156, or flash memory devices. Similarly, system 100 may also have input devices such as mouse 161, keyboard 162, and and/or output devices such as a display unit 191, printer 196, and speakers 197. Other aspects of system 100 may include network connections to other devices, computers, networks, servers, etc. using either wired or wireless media. For example, system 100 may further include modem 172 and network interface 170 for communicating with a remote computer 180 through a wide area network (WAN) 173 and/or a local area network (LAN) 171. Additionally, device 110 further includes a system bus 121 that electronically connects processing unit 120, various memory modules, input/output devices, and other functional components described above. Accordingly, processing unit 120 may directly read and write data to system memory 130. It may further exchange data with various input/output devices and networking devices through various interfaces such as memory interfaces 140 and 150, user input interface 160, network interface 170, video interface 190, and output peripheral interface 195. All these devices are well know in the art and need not be discussed at length here.

The encoding method described above may be implemented as a software program running on a general purpose digital processor similar to device 110. Specifically, the software program for implementing the encoding method may include program codes for instructing various components of device 110 to execute the method steps described above. For example, the program codes may include functional modules for providing the functions of key scheduler 102, modified LZW module 104, and the XOR operator 106. Alternatively, the software program may include separate programs, each of which is executed independently for providing the functions of key scheduler 102, modified LZW 104, and the XOR operator 106. Regardless the structure of the software program, the program codes generally includes instructions for receiving input data including the source symbol sequence and other encoding parameters, instructions for initializing the dictionary, instructions for encoding the symbol sequence according to the modified LZW described above. More specifically, the program codes for instructing device 110 to carry out the modified LZW further include instructions for searching the dictionary for a match of the string I, instructions for updating the dictionary by way of random insertion and random permutation, and instructions for determining the dictionary index for the string I.

The software program may be implemented using standard programming languages such as C/C++, C#, Java, and Basic. Alternatively, it may be implemented in commercial computing platforms such as Matlab. The software program may be a standalone program executable by device 110 independent from other programs running on device 110, or it may be a program embedded in other programs or operating system for providing data encoding and encryption. For example, it may be embedded into the UNIX operating system or the Adobe document processing program for providing data compression and encryption therein. The software program for implementing encoding system 100 may reside on non-removable memory 141, or the removable memory such as floppy disk 152 or CD/DVD 156. Upon starting the system 300 or receiving a user input through mouse 161 or keyboard 162 for executing the software program, the program codes may be loaded into memory space 135 associated with application programs in system memory 130.

On the other hand, the data to be encoded (i.e., the source symbol sequence S in FIG. 1) may be received by the device 110 through various devices. For example, the data may be stored in non-removable memory 141 and loaded into memory space 137 associated with the program data in system memory 130. Alternatively, the data to be encoded may be stored on floppy disk 152 or CD/DVD 156 and read into memory space 137 through memory interface 150 and disks reader 151 or 155. Still alternatively, the data to be encoded may be input through keyboard 162 by a user or through network interface 170 from remote computer 180. According to a further embodiment, the source symbol sequence S may be generated from input data that are in various formats. For example, the input data may be in the ASCII text format, the Microsoft Word format, the HTML format, the XML format, the PDF format, or other suitable proprietary formats.

When a further instruction is received for executing the encoding process, the program codes including the instructions are read from memory space 135 and interpreted by processing unit 120. The program codes may instruct processing unit 120 to load the data that is previously received and stored in memory space 137 and processing the data according to the method described herein. During the process of the encoding, intermediate data and encoding parameters including the key stream, the bit steam X, and the dictionary may be stored in memory space 137 associated with the program data or in the internal registers of processing unit 120. When the encoding is completed, the encoded data stream B may be stored in memory space 137 for subsequent processing or utilized by other programs. Alternatively, the encoded data stream B may be output to non-removable memory 141 or the removable memory including floppy disks 152 and CD/DVD 156 for storage. It may be also transmitted to remote computer 180 through network interface 170 over LAN 171 or through modem 172 over WAN 173. Still alternatively, the encoded data stream B may be displayed on display device 191. It may be embedded in other data that are not encoded so that the encoded data stream B is displayed as meaningless texts along with an indication that the content is encoded and an authorization is required to access the content.

According to some other embodiments, the encoding method and system described herein may also be implemented on proprietary software/hardware system in the form a computer card inserted into the general purpose computer system. Alternatively, it may be implemented in the field-programmable gate array (FPGA) or the application-specific integrated circuit (ASIC).

According to some embodiments a shown in FIG. 4, a computing device 400 is provided for carrying out various embodiments of the encoding method described earlier. Specifically, as shown in FIG. 4, computing device 400 includes a receiving module 402 for receiving incoming source symbol sequence, a dictionary initializer 404 for initializing the dictionary used in the encoding process, and an encoder 406 for encoding the incoming symbol sequence based on the dictionary.

According to some further embodiments, receiving module 402 may include various interfaces and memory storage devices shown in FIG. 1, such as non-removable memory interface 140 with memory 141, removable memory interface 150 with floppy disk 151 and CD/DVD 156, user input interface 160 with keyboard 162 and modem 172, and network interface 170. Receiving module 402 may further include system memory 130 where the source symbol sequence is stored for subsequence encoding. For example, the symbol sequence may be stored in memory space 137 associated with program data that may later be read and loaded to processing unit 120.

With reference to FIG. 4, dictionary initializer 404 for initializing the dictionary may be implemented on a digital processor by using program codes for carrying out the initialization process. For example, processing unit 120 may be used to execute a group of program codes for performing the initialization process on the dictionary. Specifically, the group of program codes may be stored in memory space 135 associated with application programs and read into processing unit 120 for execution.

For encoder 406 depicted in FIG. 4, it may also be implemented on a digital processor that is different from the one implementing initializer 404 or the same digital processor such as processing unit 120. Specifically, the group of program codes for carrying out encoder 406 may be read and stored in memory space 135 and then be read and loaded subsequently by processing unit 120 for encoding the source symbol sequence.

The symbols of the source symbol sequence to be encoded may be read one by one from the system memory and stored in the internal registers of processing unit 120. Additionally, the dictionary may also be stored in memory space 137 and loaded into processing unit 120 for carrying out the encoding steps such as the dictionary searching, the random insertion, and the dictionary permutation. The dictionary, after updated at each encoding iteration, may be restored back to memory space 137 or stored in the internal registers of processing unit 120. Furthermore, processing unit 120 may perform additional operations on the dictionary according the program codes for carrying out the encoding. For example, the processing unit 120 may index each entry of the dictionary using internal pointers or memory addresses. These pointers and memory addresses may be arranged so that the dictionary is represented by a two-dimensional array having a plurality of rows and a plurality of columns. Processing unit 120 may also be able to identify according to the instructions of the program codes each even or odd column and each even or odd row and then perform a cyclically shift on each of the rows and columns as described according to various embodiments of the encoding method.

Security Analysis

The security provided by the various embodiments described above are analyzed under some known attacks, and it will be shown that these embodiments are securer against these attacks than the encoding schemes based on the traditional LZW compression. According to the information the attacker can have access to, attacks can be generally classified into several types including (1) cipher-only attack, (2) known-plaintext attack, (3) chosen-plaintext attack, and (4) chosen-ciphertext attack. For the attack mode (4), attacks generally rely on security analysis that highly depend on the error corrections in a decoder. In the context of chosen-ciphertext attack, the attackers do not have access to the information of the encoding scheme as described herein. Hence, the encryption and encoding scheme described herein is secure under the chosen-ciphertext attack. With regard to the attack mode (2), the known-plaintext attack, it would be obvious to one skilled in the art that it is a weaker version of attack mode (3), the chosen-plaintext attack. Accordingly, it is sufficient for the system to be secure under the chosen-plaintext attack in order to prevent the known-plaintext attack. For these reasons, one skill in the art would recognize that it is sufficient to address the attack mode (1) and (3) in analyzing the security property of the method and system described above.

Cipher-Only Attack

In this attack scenario, the attacker can only have access to the encrypted bit stream, and wish to find out the keys used in the system. Since the information available to the attacker is very limited, a very common attack is the brute-force attack, whose complexity is related to the key space.

According to the embodiments described above, the only private information is the key used in key scheduler 102, which is of length 128 bits. Hence, the key space is $2^{128}$, which can ensure satisfactory level of security.

Alternatively, the attacker may wish to recover the key stream used in the modified LZW 104 and the XOR operator 106. However, it can be shown that this task is even harder than just finding the key in key scheduler 102 using the brute-force attack. For ease of discussion, consider the random dictionary insertion only. Since the characters $a_i$, for $1 \leq i \leq N$, can be assigned to arbitrary entries within the dictionary of size $2^b$, the key space of the random dictionary initialization and the random dictionary insertion would be $2^b!$. In the case of b=12, the key space would be of level 4096!, which is an incredibly large and extremely difficult to attach using even today's computational power. Hence, the attacker would rather use the brute-force attack with complexity $2^{128}$ to find the key used in the key scheduler, which has been shown extremely difficult.

Therefore, the data encoding methods described herein is secure against the cipher-only attack.

Chosen-Plaintext Attack

In this attack scenario, the attacker is allowed to input several source symbol sequences into the encoder, and get the corresponding bit streams.

As mentioned above, the data encoding and encryption method based on the modified LZW compression may be carried out without using the random dictionary permutation. This, however, is a less preferable embodiment that is subject to the chosen-plaintext attach as shown below.

Specifically, for the input source symbol sequence $S=\{s_1, s_2, \ldots, s_M\}$, the corresponding bit stream is given as $B=B_1B_2\ldots B_L$, where $B_i$ is of length b bits, and L is the number of indexes generated from the modified LZW. Assuming the index associated with the symbol $s_1$ in the initial dictionary is $i_1$, then $$(i_1)_2{}^b \oplus K_1 = B_1, \quad (1)$$

where $K_1$ is the first b bits in the key stream used in the XOR operator 106.

If the attacker uses a brute-force attack to break $K_1$ having a complexity $2^b=4096$, then the attacker can encode a series of source symbol sequences $X_j=\{s_j, x_2, \ldots, x_M\}$, for $1 \leq j \leq N$, where $x_m \in A$, for $2 \leq m \leq M$, are arbitrary symbols. Since $K_1$ is already known by from the brute-force attack, the attacker can then determine all the indices associated with the symbols $s_j$ in the initial dictionary. It should be noted that, without the random dictionary permutation, the indices associated with the symbols $s_j$ will not be changed over time, as the random insertion of the new string Ix will not influence the entries that has already been filled into the dictionary. Therefore, to recover $K_2$, the attacker can similarly encode another symbol sequence, $X=\{s_j, s_j, x_3, \ldots, x_L\}$. Assuming the indices of $s_j$ is $i_j$, then $$(i_j)_2^b \oplus K_2 = B_2. \quad (2)$$

As $(i_j)_2^b$ has been already known using the brute-force attack, and $B_2$ is publicly known, the attacker can uniquely determine $K_2$. Similarly, the attacker can recover all the subsequent $K_m$. After determining the entire key stream K used in the XOR operation 106, it is straightforward to recover the key stream used in the modified LZW 104. Therefore, the complexity of an attack against this embodiment without using the random dictionary permutation is of order $2^b=4096$, which is quite affordable under today's computational power.

As a result, the encoding using both the random dictionary insertion and random dictionary permutation is a more preferable embodiment. As it will be shown below, this embodiment offers a much tighter security under the chosen-plaintext attack than the one without the random dictionary permutation.

Specifically, in an attempt to attack the embodiment using both the random dictionary insertion and random dictionary permutation, the attacker may also use the relationship illustrated in equation (1), and the brute-force attack to find $K_1$. However, as described earlier in some embodiments, after each step of encoding, the dictionary is further updated through a round of column and row permutations which move each entry to a random location. If a symbol sequence $X=\{s_j, s_j, x_3, \ldots, x_L\}$ is encoded and the random permutation is applied to the dictionary, then $$(i'_j)_2^b \oplus K_2 = B_2, \quad (3)$$

where $i'_j$ is the new index of $s_j$ after the row and column permutations and $K_2$ is the second b bits of K. Since the permutation offsets are random numbers and thus unknown for the attacker to solve equation (3). Consequently, the attacker has to either determine $K_2$ or $i'_j$ by using the brute-force attack. Since both the row permutation offsets and the column permutation offsets are within the range $[0, 2^{b/2}-1]$, the complexity of finding $i'_j$ using the brute-force attack is $2^{2b}$, where the offsets for the odd and even columns are different and so are the offsets for the odd and even rows. Since the complexity of breaking $K_2$ is $2^b$, which is less than $2^{2b}$, the attacker would rather target at $K_2$. It should be noted that in this embodiment, the odd and even columns and the old and even rows are treated differently, as it is helpful to destroy the local dependence of entries. In other words, two entries close to each other are quickly separated far away from each other after several rounds of permutations. This makes the attacker difficult to utilize the information of relative locations of entries to design a potential attack.

As noted above, the attacker has to use a brute-force attack to find the consequent bits of K. After determining K, it is straightforward to recover the random number used in the random insertion as well as the permutation offsets used in the dictionary permutation. Therefore, the complexity of this chosen-plaintext attack is of order $2^{bL}$, where L is the number of indexes generated by the modified LZW 104. When L is large, the attacker would rather use the brute-force attack to find the key used in the key scheduler 102, which has been shown has a complexity of $2^b!$ and thereby very difficult to attack. Therefore, the embodiment that utilizes both the random insertion and random permutation ensures that the data encoded accordingly are secure against the chosen-plaintext attack.

Coding Efficiency

Since each dictionary index is encoded using fixed b bits, the size of the final compressed and encrypted file is equal to bL, where L is the number of indexes. It can be easily seen that the random insertion and the random dictionary permutation only change the distribution of the indexes, but does not affect the number of indices. Certainly, the XOR operation 106 does not increase the length of the final bit stream. Therefore, it can be found that the final bit stream is of the same size as that produced by the standard LZW. In other words, there is no coding efficiency loss.

Experimental Results

Described hereinafter is an example that illustrates the effectiveness of the coding method and system. Key scheduler 102 is implemented using a stream cipher RC4, which is the most widely-used software stream cipher. The 128-bit hex key is 9F7AC6DC. Modified LZW 104 uses the key stream generated by the RC4 cipher for performing random insertion and random dictionary permutation on the dictionary. Key stream generated by the RC4 cipher is also utilized in the XOR stage 106 to produce the final bit stream by encoding the bit stream from modified LZW 104.

FIG. 6(a) shows a paragraph of ASCII characters that is to be encoded and encrypted. Certainly, if the bit stream B generated by system 100 shown in FIG. 1 is input to an authorized decoder using the appropriate coding scheme with the correct key, the decoded symbol sequence is exactly the same as the original one shown in FIG. 6(a). However, if the bit stream B encoded by system 100 is input to a standard LZW decoder, the decoded symbol sequence is shown in FIG. 6(b), which is totally meaningless. It should be noted that the standard LZW decoder is somewhat different for different implementations. For instance, consider the ASCII alphabet, if the first index is larger than 255, some of the implementations will just claim a fatal error, while not outputting any symbol sequences. According to some embodiments, the decoder will still continue decoding in this case. It can be noticed that, in the decoded symbol sequence using the standard LZW, there are many repeated symbols. This is due to the fact that in the standard LZW if the entry pointed by the index is empty, the decoder will output the last decoded symbol string concatenated with its first symbol. M. Nelson, "LZW Data Compression," http://marknelson.us/1989/10/01/lzw-data-compression/ has more details about the standard LZW.

Although some exemplary embodiments of the invented injection-enhanced injection-locked frequency divider are disclosed here, it is not intended to unnecessarily limit the scope of the invention. Thus, simple modifications or variations without departing from the principle or the extent of the claims are still within the scope of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for encoding data using a compression technique based on a dictionary including:
   receiving a source symbol sequence;
   initializing the dictionary using a source alphabet in accordance with a random insertion; and
   encoding the source symbol sequence in accordance with the compression technique based on the dictionary, wherein the dictionary is updated in accordance with the random insertion and a random permutation during the encoding.

2. The method of claim 1, wherein the source alphabet includes a plurality of characters and the dictionary has a plurality entries,
   the step of initializing the dictionary further comprising randomly assigning each of the plurality of characters to one of the plurality of entries.

3. The method of claim 1, wherein the source symbol sequence includes at least a first symbol, the step of encoding the source symbol sequence further including:
   adding the first symbol to a string; and
   searching the string having the first symbol in the dictionary.

4. The method of claim 3, the source symbol sequence further includes a second symbol, the step of encoding the source symbol sequence further including:
   determining that the dictionary has a match for the string having the first symbol; and
   adding the second symbol to the string having the first symbol.

5. The method of claim 3, the step of encoding the source symbol sequence further including:
   determining that the dictionary does not have a match for the string having the first symbol;
   determining a dictionary index for the string without the first symbol;
   randomly selecting an empty entry in the dictionary for storing the string having the first symbol; and
   initializing the string to the first symbol.

6. The method of claim 5, the step of randomly selecting an empty entry in the dictionary for storing the string having the first symbol further comprising selecting the empty entry based on a keyed hashing function having a private key.

7. The method of claim 1, further comprising:
   arranging the dictionary into a two-dimensional array having a plurality of columns and a plurality of rows;
   performing a column permutation on the plurality of columns; and
   performing a row permutation on the plurality of rows.

8. The method of claim 7, further comprising cyclically shifting each of the plurality of columns.

9. The method of claim 8, wherein each even column is cyclically shifted by a first random offset and each odd column is cyclically shifted by a second random offset.

10. The method of claim 8, wherein each even row is cyclically shifted by a third random offset and each odd row is cyclically shifted by a fourth random offset.

11. The method of claim 7, further comprising cyclically shifting each of the plurality of rows.

12. The method of claim 1, further comprising generating an encoded data stream by combining the encoded source symbol sequence with a key stream generated by a stream cipher.

13. The method of claim 1, wherein the compression technique is one of a Lempel-Ziv-Welch compression, a Lempel-Ziv-Storer-Szymanski compression, and a Lempel-Ziv-Ross compression.

14. A computer readable medium having computer codes stored thereon, the computer codes includes computer executable instructions when executed by one or more digital processors providing data encoding using a compression technique based on a dictionary, the computer codes including:
   instructions for receiving a source symbol sequence;
   instructions for initializing the dictionary using a source alphabet in accordance with a random insertion;
   instructions for encoding the source symbol sequence in accordance with the compression technique; and
   instructions for updating the dictionary in accordance with the random insertion and a random dictionary permutation during the encoding.

15. The computer readable medium of claim 14, wherein the source alphabet includes a plurality of characters and the dictionary includes a plurality of entries, the computer codes further including:
   instructions for randomly assigning each of the plurality of characters to one of the plurality of entries.

16. The computer readable medium of claim 14, the computer codes further comprising instructions for generating an output data stream by combining the encoded source symbol sequence with a key stream in accordance with an exclusive-or operation.

17. The computer readable medium of claim 14, wherein the source symbol sequence includes a plurality of symbols, the computer codes further comprising:
 instructions for adding a first symbol to a string;
 instructions for determining that the dictionary does not have an entry that matches the string having the first symbol;
 instructions for determining a dictionary index for the string without the first symbol;
 instructions for randomly selecting an empty entry in the dictionary for storing the string having the first symbol; and
 instructions for initializing the string to the first symbol.

18. The computer readable medium of claim 14, wherein the compression technique is one of a Lempel-Ziv-Welch compression, a Lempel-Ziv-Storer-Szymanski compression, and a Lempel-Ziv-Ross compression.

19. A method for encoding a source symbol sequence using a dictionary having a plurality of entries, the source symbol sequence including a plurality of symbols, the method comprising performing the following steps until the source symbol sequence is exhausted:
 initializing a string to a symbol of the source symbol sequence;
 searching in the dictionary for a longest entry matching the string;
 performing (a)-(b) until no match for the string can be found in the dictionary:
  (a) determining that the dictionary has the longest entry matching the string and the dictionary index of the longest entry matching the string;
  (b) adding another symbol from the source symbol sequence to the string;
 storing the dictionary index;
 randomly selecting an entry in the dictionary for storing the string without the another symbol; and
 performing a random dictionary permutation.

20. The method of claim 19, wherein performing the random dictionary permutation further comprising:
 arranging the dictionary into a two-dimensional array having a plurality of columns and a plurality of rows; and
 performing the random dictionary permutation on the plurality of columns and the plurality of rows.

21. The method of claim 20, further comprising:
 cyclically shifting at least one odd column of the plurality of columns by a first random offset; and
 cyclically shifting at least one even column of the plurality of columns by a second random offset.

22. The method of claim 21, further comprising:
 cyclically shifting at least one odd row of the plurality of rows by a third random offset; and
 cyclically shifting at least one even row of the plurality of rows by a fourth random offset.

23. The method of claim 19, further comprising:
 generating a key stream for use in the random insertion and the random dictionary permutation.

24. The method of claim 23, wherein the entry for storing the string without the another symbol is selected based on a hashing function having secret keys associated with a portion of the key stream.

25. The method of claim 19, wherein the dictionary index includes one or more binary bits, the method further comprising:
 generating a stream of dictionary indices representing the source symbol sequence;
 generating an encoded data stream by combining the stream of dictionary indices with a key stream in accordance with an exclusive-or operation; and
 outputting the encoded data stream.

\* \* \* \* \*